(12) United States Patent
Wei

(10) Patent No.: US 9,961,250 B1
(45) Date of Patent: May 1, 2018

(54) CAMERA DEVICE AND TERMINAL HAVING SAME

(71) Applicant: GUANGDONG OPPO MOBILE TELECOMMUNICATIONS CORP., LTD., Dongguan, Guangdong (CN)

(72) Inventor: Yi Wei, Dongguan (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 0 days. days.

(21) Appl. No.: 15/837,493

(22) Filed: Dec. 11, 2017

Related U.S. Application Data

(63) Continuation of application No. 15/547,629, filed as application No. PCT/CN2016/082579 on May 19, 2016.

(30) Foreign Application Priority Data

Jun. 30, 2015 (CN) .......................... 2015 1 0382937

(51) Int. Cl.
*H04N 5/225* (2006.01)
*H04N 5/232* (2006.01)

(52) U.S. Cl.
CPC ......... *H04N 5/2259* (2013.01); *H04N 5/2252* (2013.01); *H04N 5/2253* (2013.01);
(Continued)

(58) Field of Classification Search
CPC .. H04N 5/2251; H04N 5/2252; H04N 5/2253; H04N 5/2254; H04N 5/2257; H04N 5/2259

See application file for complete search history.

(56) References Cited

U.S. PATENT DOCUMENTS 5,912,774 A * 6/1999 Yoshida ................... G02B 7/36
                                                        359/823
6,639,625 B1 * 10/2003 Ishida .................. H04N 1/0402
                                                        348/218.1
(Continued)

FOREIGN PATENT DOCUMENTS

CN          1940617 A       4/2007
CN       201066880 Y        5/2008
(Continued)

OTHER PUBLICATIONS

The First Chinese Office Action dated Jul. 5, 2016, Appln. No. 201510382937.4.
(Continued)

*Primary Examiner* — Daniel M Pasiewicz
(74) *Attorney, Agent, or Firm* — Ladas & Parry LLP

(57) ABSTRACT

A camera device is proposed. The camera device includes a housing, a mounting barrel for mounting a camera lens, a supporting member, elastic members, a rotating ring, and a driving motor. The housing has a protrusive limiter disposed thereon. The mounting barrel has a ring-shaped flange disposed on an exterior peripheral face thereof. The central axes of the mounting barrel and the rotating ring forms an angle such that the mounting barrel is inclined with respect to the rotating ring. The plural elastic members being arranged around the ring-shaped flange. The driving motor is connected to the rotating ring in a transmission way for driving rotation of the rotating ring. The rotating ring has a protruding member disposed thereon and the protruding member is rotated along with the rotating ring. The protruding member is abutted on the ring-shaped flange.

10 Claims, 1 Drawing Sheet

(52) U.S. Cl.
CPC ......... *H04N 5/2254* (2013.01); *H04N 5/2257* (2013.01); *H04N 5/23238* (2013.01)

(56) References Cited

U.S. PATENT DOCUMENTS

| | | | | |
|---|---|---|---|---|
| 7,324,152 | B2* | 1/2008 | Yoon | H04N 5/2251 348/340 |
| 7,443,446 | B2* | 10/2008 | Seo | H04M 1/0214 348/373 |
| 7,656,460 | B2* | 2/2010 | Wernersson | G02B 7/08 348/357 |
| 8,405,765 | B2* | 3/2013 | Lin | H04N 5/2257 348/373 |
| 2008/0079847 | A1* | 4/2008 | Kung | H04N 5/2252 348/373 |
| 2008/0079848 | A1* | 4/2008 | Kung | H04N 5/2252 348/373 |
| 2009/0091832 | A1* | 4/2009 | Nagai | G02B 27/646 359/557 |
| 2014/0002676 | A1* | 1/2014 | Ning | G02B 7/14 348/187 |

FOREIGN PATENT DOCUMENTS

| | | |
|---|---|---|
| CN | 101794059 A | 8/2010 |
| CN | 201837810 U | 5/2011 |
| CN | 102131042 A | 7/2011 |
| CN | 102243361 A | 11/2011 |
| CN | 102540392 A | 7/2012 |
| CN | 203406937 U | 1/2014 |
| CN | 104994263 A | 10/2015 |

OTHER PUBLICATIONS

Notice of Patent Grant dated Oct. 10, 2016; Appln. No. 201510382937.4.

* cited by examiner

CAMERA DEVICE AND TERMINAL HAVING SAME

CROSS REFERENCE TO RELATED APPLICATIONS

This application is a continuation of application Ser. No. 15/547,629, filed on Jul. 31, 2017,which is the National Stage of International Application No. PCT/CN2016/082579, filed on May 19, 2016, which claims priority to Chinese Application No. 201510382937.4, filed Jun. 30, 2015. The entire disclosures of the above applications are incorporated herein by reference.

BACKGROUND

1. Field of the Disclosure

The present disclosure relates to photographing techniques, and more particularly, to a camera device and a terminal having the camera device.

2. Description of Related Art

Currently, camera lenses on terminal devices are usually adopted from existing camera lenses in the market. Because of the limited view angle of these cameras, wide-angle photographing is impossible to be carried out. The wide-angle photographing is often required in using the terminal, so as to contain much content in a picture. Generally speaking, currently, the camera lenses are directly mounted on the terminals. View angles have already been determined by fastening members of the camera lenses. It is difficult to carry out the wide-angle photography. Therefore, a device capable of enlarging the view angle of the existing camera lenses is necessary.

SUMMARY

In order to solve the technical problems, the present disclosure proposes a camera device and a terminal for enlarging a view angle of a camera lens.

In an aspect of the present disclosure, an embodiment of the present disclosure provides a camera device, which includes a housing, a mounting barrel for mounting a camera lens, a supporting member, elastic members, a rotating ring, and a driving motor.

The mounting barrel, the rotating ring, and the elastic members are all deployed inside the housing; one end of the housing is fastened to the supporting member and the other end of the housing has a protrusive limiter disposed on an inner wall thereof.

The mounting barrel is positioned circumferentially with respect to the housing; the mounting barrel has a ring-shaped flange disposed on an exterior peripheral face thereof; the ring-shaped flange and the mounting barrel are coaxially aligned to each other; central axes of the mounting barrel and the rotating ring form an angle such that the mounting barrel is inclined with respect to the rotating ring.

The plural elastic members are arranged around the ring-shaped flange; the elastic members are disposed between the ring-shaped flange and the protrusive limiter for providing a force to make the ring-shaped flange and the protrusive limiter away from each other.

The rotating ring is disposed between the ring-shaped flange and the supporting member; the rotating ring is connected to the supporting member and rotatable about its own axis.

The driving motor is connected to the rotating ring in a transmission way for driving rotation of the rotating ring; the rotating ring has a protruding member disposed thereon and the protruding member is rotated along with the rotating ring; the protruding member is abutted on the ring-shaped flange.

The mounting barrel and the housing has a circumferential positioning structure disposed therebetween.

In the camera device, the elastic members are elastic sheets.

In the camera device, the camera device further includes a connecting ring in a form of a circular sheet; the connecting ring and the plural elastic members are integrally formed; the connecting ring is connected to the protrusive limiter; one end of each of the elastic members is fastened to the connecting ring and the other end of each of the elastic members is abutted on the ring-shaped flange.

In the camera device, the protruding member is a ball and the rotating ring has a locating slot disposed thereon for confining the ball.

In the camera device, the driving motor is connected to the rotating ring via a transmission gear set.

In the camera device, the driving motor is disposed outside the housing.

In the camera device, one end of the mounting barrel near the protrusive limiter is extending out of the housing.

In the camera device, the mounting barrel has an elastic metal piece disposed therein for connecting to the camera lens.

In the camera device, a flexible circuit board is disposed outside the mounting barrel, and one end of the flexible circuit board is electrically connected to the elastic metal piece.

An embodiment of the present disclosure further provides a camera device, which includes a housing, a mounting barrel for mounting a camera lens, a supporting member, elastic members, a rotating ring, and a driving motor.

The mounting barrel, the rotating ring, and the elastic members are all deployed inside the housing; one end of the housing is fastened to the supporting member and the other end of the housing has a protrusive limiter disposed on an inner wall thereof.

The mounting barrel is positioned circumferentially with respect to the housing; the mounting barrel has a ring-shaped flange disposed on an exterior peripheral face thereof; the ring-shaped flange and the mounting barrel are coaxially aligned to each other; central axes of the mounting barrel and the rotating ring form an angle such that the mounting barrel is inclined with respect to the rotating ring.

The plural elastic members are arranged around the ring-shaped flange; the elastic members are disposed between the ring-shaped flange and the protrusive limiter for providing a force to make the ring-shaped flange and the protrusive limiter away from each other.

The rotating ring is disposed between the ring-shaped flange and the supporting member; the rotating ring is connected to the supporting member and rotatable about its own axis.

The driving motor is connected to the rotating ring in a transmission way for driving rotation of the rotating ring; the rotating ring has a protruding member disposed thereon and the protruding member is rotated along with the rotating ring; the protruding member is abutted on the ring-shaped flange.

In the camera device, the elastic members are elastic sheets.

In the camera device, the camera device further includes a connecting ring in a form of a circular sheet; the connecting ring and the plural elastic members are integrally formed; the connecting ring is connected to the protrusive limiter; one end of each of the elastic members is fastened to the connecting ring and the other end of each of the elastic members is abutted on the ring-shaped flange.

In the camera device, the protruding member is a ball and the rotating ring has a locating slot disposed thereon for confining the ball.

In the camera device, the driving motor is connected to the rotating ring via a transmission gear set.

In the camera device, the driving motor is disposed outside the housing.

In the camera device, one end of the mounting barrel near the protrusive limiter is extending out of the housing.

In the camera device, the mounting barrel has an elastic metal piece disposed therein for connecting to the camera lens.

In the camera device, a flexible circuit board is disposed outside the mounting barrel, and one end of the flexible circuit board is electrically connected to the elastic metal piece.

The present disclosure further provides a terminal, which includes the aforesaid camera device and a camera lens. The camera lens is fastened to and mounted on the mounting barrel of the camera device.

In the terminal, the mounting barrel and the housing has a circumferential positioning structure disposed therebetween.

In the camera device and the terminal provided in the present disclosure, when the protruding member is rotated along with the rotating ring, the protruding member can abut sequentially on different peripheral positions of the ring-shaped flange such that the mounting barrel can be sequentially tilted toward different directions. The camera lens is mounted on the mounting barrel, and the two elements are coaxially aligned to each other. Following the lead of the mounting barrel, the camera lens can be tilted toward different directions such that a relatively large view angle is acquired and a wide-angle effect is carried out.

DETAILED DESCRIPTION OF THE PREFERRED EMBODIMENTS

A clear and complete description of technical schemes of embodiments of the present disclosure is provided below with reference to the accompanying drawings.

Figure 1:
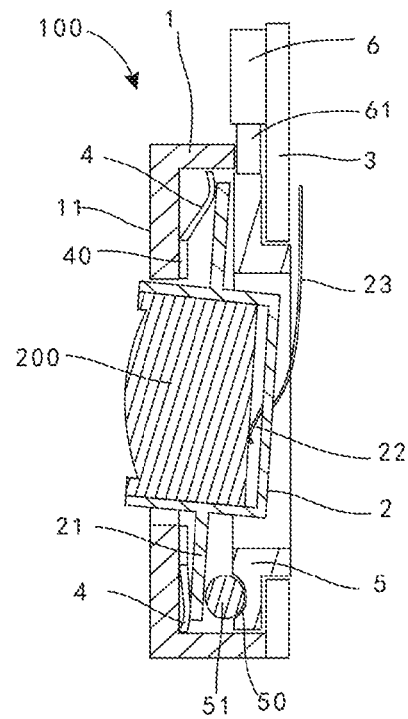
FIG. 1 is a sectional view of a camera device provided in a preferred embodiment of the present disclosure.
Figure 2:
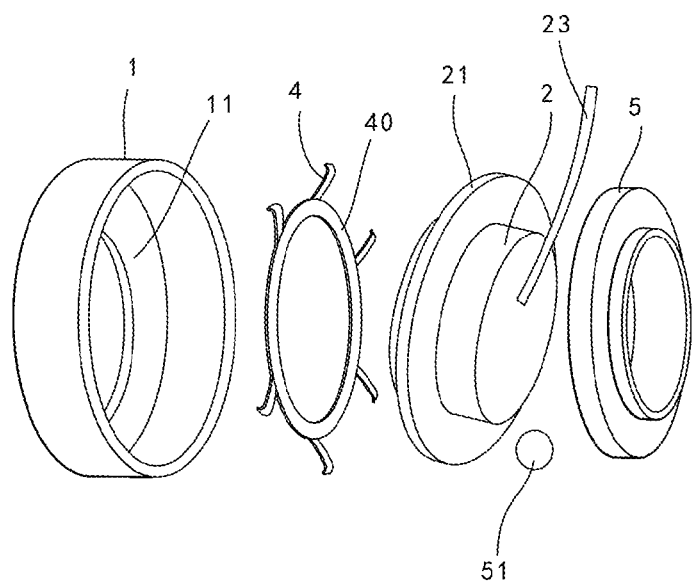
FIG. 2 is an explored view of a part of elements of the camera device shown in FIG. 1.

FIG. 1 and FIG. 2 show a terminal provided in a preferred embodiment of the present disclosure. The terminal can be implemented by a cell phone, a personal digital assistant (PDA), or a tablet computer. The terminal includes a camera lens 200 and a camera device 100. The camera lens 200 is mounted on the camera device 100. The camera device 100 includes a housing 1, a mounting barrel 2 for mounting the camera lens 200, a supporting member 3, elastic members 4, a rotating ring 5, and a driving motor 6. The camera lens 200 is fastened in the mounting barrel 2. The housing 1 and the supporting member 3 are fastened and connected to each other. All of the mounting barrel 2, the rotating ring 5, and the elastic members 4 are deployed inside the housing 1. The driving motor 6 is fastened to the supporting member 3. In such a manner, the entire camera device 100 becomes a single module for ease of assembling and disassembling.

One end of the housing 1 is fastened to the supporting member 3 and the other end of the housing 1 has a protrusive limiter 11 disposed on an inner wall thereof. The use of the protrusive limiter 11 can make the mounting barrel 2, the rotating ring 5, and other elements confined in the housing 1. The mounting barrel 2 is positioned circumferentially with respect to the housing 1 such that the mounting barrel 2 is only able to be directed in a slantwise position without rotation with respect to the housing 1. The mounting barrel 2 has a ring-shaped flange 21 disposed on an exterior peripheral face thereof. The ring-shaped flange 21 and the mounting barrel 2 are coaxially aligned to each other. The central axes of the mounting barrel 2 and the rotating ring 5 form an angle such that the mounting barrel 2 is inclined with respect to the rotating ring 5.

There are a plurality of elastic members 4 arranged around the ring-shaped flange 21. The elastic members 4 are disposed between the ring-shaped flange 21 and the protrusive limiter 11 for providing a force to make the ring-shaped flange 21 and the protrusive limiter 11 away from each other. The rotating ring 5 is disposed between the ring-shaped flange 21 and the supporting member 3. The rotating ring 5 is connected to the supporting member 3 but is able to rotate about its own axis. The driving motor 6 is connected to the rotating ring 5 in a transmission way for driving the rotating ring 5 to make it rotate. The rotating ring 5 has a protruding member 51 disposed thereon and the protruding member 51 is rotated along with the rotating ring 5. The protruding member 51 is abutted on the ring-shaped flange 21, and the elastic member 4 located relative to the protruding member 51 is pressed. The elastic member 4 located at the other side with respect to the axis of the ring-shaped flange 21 can provide an elastic force such that the distance between the ring-shaped flange 21 and the protrusive limiter 11 is relatively large at this place. Therefore, cooperation between the elastic member 4 and the protruding member 51 can make the mounting barrel 2 maintain at a tilted state.

When the protruding member 51 rotates along with the rotating ring 5, the protruding member 51 can abut sequentially on different peripheral positions of the ring-shaped flange 21. In such a manner, the mounting barrel 2 can be sequentially tilted toward different directions. The camera lens 200 is placed in the mounting barrel 2 and they are coaxially aligned. Following the lead of the mounting barrel 2, the camera lens 200 can be tilted toward different directions such that a relatively large view angle is acquired and a wide-angle effect is carried out. A plurality of images of different view angles may be obtained when the camera lens 200 is tilted toward different directions. By a synthesis of the images carried out from multiple directions, a picture of a large view angle is thus obtained. Therefore, a camera lens of an ordinary view angle in the existing market is sufficient to carry out the wide-angle effect Both of the ring-shaped flange 21 and the rotating ring 5 are disposed outside the mounting barrel 2. This can reduce axial dimension of the mounting barrel 2 and is beneficial to miniaturization of the terminal device. Since the change to the mounting barrel 2 is the tilt angle and the mounting barrel 2 does not require to be rotated, the camera lens 200 does not need to rotate. Therefore, it is convenient to carry out electrical connection between the camera lens 200 and a system board and this facilitates the transmission of image data.

In the present embodiment, the elastic members 4 are elastic sheets. Their structures are simple and are easy to be processed and prepared. The camera device 100 further includes a connecting ring 40 in a form of a circular sheet. The connecting ring 40 and the plural elastic members 4 are integrally formed. The connecting ring 40 is connected to the protrusive limiter 11. One end of each of the elastic members 4 is fastened to the connecting ring 40 and the other end of the elastic members 4 is abutted on the ring-shaped flange 21. The connecting ring 40 can connect the plural elastic members 4 to become a unity. Therefore, it is convenient to process and prepare the plural elastic members 4 and facilitate the assembly.

During preparation of the elastic members 4, a metal material in a form of a sheet can be punched to form the connecting ring 40 and the plural elastic members 4. This process is simple and convenient, and the cost is low. During the assembling process, it is only required to put the unity of the connecting ring 40 and the plural elastic members 4 upon the mounting barrel 2. There is no need to use a fastening member to fasten the connecting ring 40 to the ring-shaped flange 21 or the protrusive limiter 11.

In other embodiments, the elastic members 4 can be deployed between the ring-shaped flange 21 and the protrusive limiter 11. One end of each of the elastic members 4 can be directly fastened to the ring-shaped flange 21 (or the protrusive limiter 11) while the other end is abutted on the protrusive limiter 11 (or the ring-shaped flange 21). In another further embodiment, the elastic members 4 can also be implemented by compressed springs. The two ends of the compressed springs can be respectively abutted on the ring-shaped flange 21 and the protrusive limiter 11 for providing a force to make the two elements away from each other. In such a manner, the mounting barrel 2 is maintained at a tilted state. Alternatively, the elastic members 4 can also be any other elements capable of providing an elastic force.

The protruding member 51 is a ball. The rotating ring 5 has a locating slot 50 disposed thereon for confining the ball. The locating slot 50 can make the rotating ring 5 drive the protruding member 51 such that the protruding member 51 rotates together with the rotating ring 5 about the axis of the rotating ring 5. In the case that the protruding member 51 is implemented by a ball, the friction between the protruding member 51 and the ring-shaped flange 21 can be reduced and this facilitates the rotation of the protruding member 51. In other embodiments, the protruding member 51 can also be implemented by a bump or a boss fastened to the rotating ring 5. The surface of the bump or the boss can be a spherical surface in order to facilitate cooperation with the ring-shaped flange 21. The rotating ring 5 can be integrally formed with the bump or the boss for facilitating its fabrication.

The driving motor 6 is connected to the rotating ring 5 via a transmission gear set 61. By using the transmission gear set 61, the stability of rotation of the rotating ring 5 can be assured and the rotation speed of an output shaft of the driving motor 6 can be transformed into an appropriate rotation speed of the rotating ring 5. The rotating ring 5 may be sheathed with a gear in order to connect to the transmission gear set 61. The driving motor 6 is disposed outside the housing 1 so as to reduce the size of the housing 1 and facilitate the installation of the driving motor 6. The driving motor 6 and the transmission gear set 61 can be combined to form an integrated structure. That is, the driving motor 6 and the transmission gear set 61 are integrated into a single module for facilitating the assembling, disassembling, and maintenance.

One end of the mounting barrel 2 near the protrusive limiter 11 is extending out of the housing 1. This can prevent the protrusive limiter 11 from interfering the view angle of the camera lens 200 after installation of the camera lens 200. In an embodiment, the axial dimension of the housing 1 is decreased such that one end of the mounting barrel 2 can be located outside the housing 1.

In order to carry out circumferential positioning between the mounting barrel 2 and the housing 1, a circumferential positioning structure can be disposed between the two elements. For instance, the ring-shaped flange 21 has a positioning protrusion disposed thereon and the housing 1 has a positioning slot disposed on an inner part thereof. The positioning slot is a strip disposed along an axial direction of the housing 1. The positioning protrusion slides within the positioning slot. The cooperation of the positioning slot and the positioning protrusion can make a point on the ring-shaped flange 21 corresponding to the position of the positioning protrusion move along the axial direction so as to carry out altering the tilt angle without causing rotation of the ring-shaped flange 21 with respect to the housing 1. Alternatively, the positioning protrusion is arranged on the inner wall of the housing 1 and the positioning slot is arranged on the peripheral surface of the ring-shaped flange 21. In another further embodiment, a slot can be disposed on the ring-shaped flange 21 at a position abutted on the elastic member 4. The elastic member 4 is abutted on the slot. By the interaction between the elastic member 4 and the slot, the mounting barrel 2 can be positioned circumferentially with respect to the housing 1 so as to prevent the rotating ring 5 from causing the mounting barrel 2 to rotate.

The mounting barrel 2 has an elastic metal piece 22 disposed therein for connecting to the camera lens 200. The elastic metal piece 22 is used to abut on a metal joint of the camera lens 200 so as to carry out electric connection with the camera lens 200. Once the camera lens 200 is mounted on the mounting barrel 2, the camera lens 200 is fixed and electrically connected. Further, there is a flexible circuit board 23 disposed outside the mounting barrel 2. One end of the flexible circuit board 23 is electrically connected to the elastic metal piece 22 and the other end can be connected to a system board of the terminal. In such a manner, the connection between the camera lens 200 and the system board is carried out. By use of flexibility of the flexible circuit board 23, the flexible circuit board 23 may be tilted and deformed to a certain degree along with the mounting barrel 2 but the electrical connection is not affected. The other end of the flexible circuit board 23 can be plugged on the system board or detachably connected to the system hoard via an electrical connection member so as to facilitate assembly and connection between the camera device 100 and the system board. It is convenient to assemble and disassemble the camera device 100.

In the camera device 100 provided in the present disclosure, an existing camera lens 200 in the market can be mounted on the terminal device. The camera lens 200 is mounted on the mounting barrel 2. When a photo is being taken, the driving motor 6 drives the rotation of the rotating ring 5, and the mounting barrel 2 and the camera lens 200 can be sequentially inclined toward different directions by the cooperation of the protruding member 51 and the elastic members 4. In such a manner, images of various view angles are obtained so as to carry out the effect of wide angle. The obtained images of various view angles can be synthesized to carry out a wide-angle picture by post processing with use of software in the terminal. The camera device 100 is simple in structure and is easy to be fabricated without occupying much inner space of the terminal.

The foregoing descriptions are not intended to limit the protection scope of the disclosure. Any modifications, identical replacements and improvements made within the spirit and principles of the disclosure shall fall in the protection scope of the disclosure.

What is claimed is:

1. A camera device, characterized in comprising a housing, a mounting barrel for mounting a camera lens, a supporting member, elastic members, a rotating ring, and a driving motor;
   all of the mounting barrel, the rotating ring, and the elastic members deployed inside the housing; one end of the housing being fastened to the supporting member and the other end of the housing having a protrusive limiter disposed on an inner wall thereof;
   the mounting barrel positioned circumferentially with respect to the housing; the mounting barrel having a ring-shaped flange disposed on an exterior peripheral face thereof; the ring-shaped flange and the mounting barrel coaxially aligned to each other; central axes of the mounting barrel and the rotating ring forming an angle such that the mounting barrel is inclined with respect to the rotating ring;
   the plural elastic members arranged around the ring-shaped flange; the elastic members disposed between the ring-shaped flange and the protrusive limiter for providing a force to make the ring-shaped flange and the protrusive limiter away from each other;
   the rotating ring disposed between the ring-shaped flange and the supporting member; the rotating ring connected to the supporting member and rotatable about its own axis;
   the driving motor connected to the rotating ring in a transmission way for driving rotation of the rotating ring; the rotating ring having a protruding member disposed thereon and the protruding member abutted on the ring-shaped flange; the protruding member rotated along with the rotating ring such that the mounting barrel is inclined toward different directions.

2. The camera device according to claim 1, characterized in that the elastic members are elastic sheets.

3. The camera device according to claim 2, characterized in that the camera device further comprises a connecting ring in a form of a circular sheet; the connecting ring and the plural elastic members are integrally formed; the connecting ring is connected to the protrusive limiter; one end of each of the elastic members is fastened to the connecting ring and the other end of each of the elastic members is abutted on the ring-shaped flange.

4. The camera device according to claim 1, characterized in that the protruding member is a ball and the rotating ring has a locating slot disposed thereon for confining the ball.

5. The camera device according to claim 1, characterized in that the driving motor is connected to the rotating ring via a transmission gear set.

6. The camera device according to claim 1, characterized in that the driving motor is disposed outside the housing.

7. The camera device according to claim 1, characterized in that one end of the mounting barrel near the protrusive limiter is extending out of the housing.

8. The camera device according to claim 1, characterized in that the mounting barrel has an elastic metal piece disposed therein for connecting to the camera lens.

9. The camera device according to claim 8, characterized in that a flexible circuit board is disposed outside the mounting barrel, and one end of the flexible circuit board is electrically connected to the elastic metal piece.

10. A terminal, characterized in comprising the camera device according to claim 1 and a camera lens, the camera lens fastened to and mounted on the mounting barrel of the camera device.

* * * * *